United States Patent
Kubo et al.

(10) Patent No.: US 12,287,501 B2
(45) Date of Patent: *Apr. 29, 2025

(54) LIGHT-ABSORBING COMPOSITION, LIGHT-ABSORBING FILM, AND OPTICAL FILTER

(71) Applicant: Nippon Sheet Glass Company, Limited, Tokyo (JP)

(72) Inventors: Yuichiro Kubo, Tokyo (JP); Katsuhide Shimmo, Kanagawa (JP); Lei Cai, Kanagawa (JP); Hitomi Masuda, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 572 days.

This patent is subject to a terminal disclaimer.

(21) Appl. No.: 17/595,687

(22) PCT Filed: May 20, 2020

(86) PCT No.: PCT/JP2020/020005
§ 371 (c)(1),
(2) Date: Nov. 22, 2021

(87) PCT Pub. No.: WO2020/235610
PCT Pub. Date: Nov. 26, 2020

(65) Prior Publication Data
US 2022/0214481 A1      Jul. 7, 2022

(30) Foreign Application Priority Data

May 23, 2019   (JP) .................. 2019-096708

(51) Int. Cl.
G02B 5/00           (2006.01)
C08K 5/5317     (2006.01)
(Continued)

(52) U.S. Cl.
CPC ............ *G02B 5/208* (2013.01); *C08K 5/5317* (2013.01); *C09D 5/32* (2013.01); *C09D 7/63* (2018.01); *C09D 183/04* (2013.01); *G02B 5/003* (2013.01)

(58) Field of Classification Search
CPC .......... G02B 5/003; G02B 5/208; C09D 5/32; C09D 7/63; C09D 183/04; C08K 5/5317
See application file for complete search history.

(56) References Cited

U.S. PATENT DOCUMENTS 5,764,416 A    6/1998  Rahn
6,168,825 B1   1/2001  O'Brien et al.
(Continued)

FOREIGN PATENT DOCUMENTS

CN      205157947 U    4/2016
EP        1672047 A1    6/2006
(Continued)

OTHER PUBLICATIONS

International Search Report and Written Opinion issued for International Patent Application No. PCT/JP2020/020005, Date of mailing: Aug. 18, 2020, 9 pages including English translation of Search Report.
(Continued)

*Primary Examiner* — Bijan Ahvazi
(74) *Attorney, Agent, or Firm* — HSML P.C.

(57) ABSTRACT

The light-absorbing composition according to the present invention includes: a light absorber made of a phosphonic acid represented by the following formula (A) and copper ion; and a curable resin. A light-absorbing film having desired properties can be provided by curing a coating film of the light-absorbing composition. In the formula (A), $R_1$ to $R_5$ are each independently a hydrogen atom, a halogen atom, a hydroxy group, or a nitro group, and n represents an integer of 1 to 3.

(Continued)

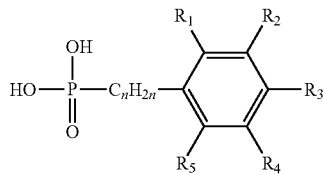

(A)

11 Claims, 4 Drawing Sheets (51) Int. Cl.
  *C09D 5/32* (2006.01)
  *C09D 7/63* (2018.01)
  *C09D 183/04* (2006.01)
  *G02B 5/20* (2006.01)

(56) References Cited

U.S. PATENT DOCUMENTS

| | | | |
|---|---|---|---|
| 7,025,908 B1 | 4/2006 | Hayashi et al. | |
| 10,809,427 B2 | 10/2020 | Kubo et al. | |
| 11,300,719 B2 | 4/2022 | Kubo et al. | |
| 11,535,726 B2 | 12/2022 | Kubo et al. | |
| 11,592,603 B2 * | 2/2023 | Kubo | G02B 5/208 |
| 11,885,993 B2 * | 1/2024 | Kubo | G03B 11/00 |
| 2004/0165098 A1 | 8/2004 | Ikeda | |
| 2005/0035336 A1 | 2/2005 | Kuwabara | |
| 2010/0210772 A1 | 8/2010 | Hiwatashi | |
| 2010/0220377 A1 | 9/2010 | Yamada et al. | |
| 2011/0042771 A1 | 2/2011 | Huang et al. | |
| 2012/0243077 A1 | 9/2012 | Osawa et al. | |
| 2014/0063597 A1 | 3/2014 | Shimmo et al. | |
| 2014/0300956 A1 | 10/2014 | Kubo et al. | |
| 2014/0350146 A1 | 11/2014 | Tsubouchi | |
| 2015/0160386 A1 | 6/2015 | Takemura | |
| 2015/0293283 A1 | 10/2015 | Nara et al. | |
| 2015/0293284 A1 | 10/2015 | Tatemura | |
| 2015/0331163 A1 | 11/2015 | Iwasaki et al. | |
| 2016/0116653 A1 | 4/2016 | Murayama et al. | |
| 2016/0170105 A1 | 6/2016 | Nagaya et al. | |
| 2016/0195651 A1 | 7/2016 | Yoshioka et al. | |
| 2016/0326043 A1 | 11/2016 | Sun | |
| 2017/0017023 A1 | 1/2017 | Sugiyama et al. | |
| 2017/0066933 A1 | 3/2017 | Shiono et al. | |
| 2017/0146708 A1 | 5/2017 | Lah | |
| 2017/0184765 A1 | 6/2017 | Shiono et al. | |
| 2017/0343710 A1 | 11/2017 | Shiono et al. | |
| 2018/0003872 A1 | 1/2018 | Kubo et al. | |
| 2018/0114805 A1 | 4/2018 | Takiguchi et al. | |
| 2018/0282521 A1 | 10/2018 | Kubo et al. | |
| 2018/0346729 A1 | 12/2018 | Miyake et al. | |
| 2019/0219749 A1 | 7/2019 | Shimmo et al. | |
| 2019/0346601 A1 | 11/2019 | Kubo et al. | |
| 2020/0040161 A1 | 2/2020 | Kubo et al. | |
| 2020/0158930 A1 * | 5/2020 | Kubo | G02B 5/22 |
| 2020/0233130 A1 | 7/2020 | Kubo | |
| 2020/0379150 A1 | 12/2020 | Takagi et al. | |
| 2023/0152502 A1 | 5/2023 | Kubo | |

FOREIGN PATENT DOCUMENTS

| | | | | |
|---|---|---|---|---|
| JP | H1152127 A | 2/1999 | | |
| JP | 2001154015 A | 6/2001 | | |
| JP | 2002069305 | 3/2002 | | |
| JP | 2005325292 A | 11/2005 | | |
| JP | 2009242650 A | 10/2009 | | |
| JP | 2011203467 A | 10/2011 | | |
| JP | 2011227528 A | 11/2011 | | |
| JP | 2012087243 | 5/2012 | | |
| JP | 2012201865 | 10/2012 | | |
| JP | 2012201865 A * | 10/2012 | | C08K 3/24 |
| JP | 2013156460 A | 8/2013 | | |
| JP | 2014191346 A | 10/2014 | | |
| JP | 2015043061 A | 3/2015 | | |
| JP | 2015229743 A | 12/2015 | | |
| JP | 2016157123 A | 9/2016 | | |
| JP | 6087464 B1 | 3/2017 | | |
| JP | 6232161 B1 | 11/2017 | | |
| JP | 6267823 B1 | 1/2018 | | |
| JP | 6339755 B1 | 6/2018 | | |
| JP | 2019012121 A | 1/2019 | | |
| JP | 6516948 B1 | 5/2019 | | |
| WO | 9926952 A1 | 6/1999 | | |
| WO | 2011071052 A1 | 6/2011 | | |
| WO | 2014034386 A1 | 3/2014 | | |
| WO | 2014104370 A1 | 7/2014 | | |
| WO | 2015056734 A1 | 4/2015 | | |
| WO | 2015099060 A1 | 7/2015 | | |
| WO | 2016043166 A1 | 3/2016 | | |
| WO | 2016114362 A1 | 7/2016 | | |
| WO | 2016133099 A1 | 8/2016 | | |
| WO | 2017006571 A1 | 1/2017 | | |
| WO | 2017051512 A1 | 3/2017 | | |
| WO | 2017094858 A1 | 6/2017 | | |
| WO | 2017135359 A1 | 8/2017 | | |
| WO | 2018021222 A1 | 2/2018 | | |
| WO | 2018155634 A1 | 8/2018 | | |
| WO | 2018221424 A1 | 12/2018 | | |

OTHER PUBLICATIONS

International Search Report and Written Opinion issued for International Patent Application No. PCT/JP2018/022490, Date of mailing: Sep. 11, 2018, 9 pages including English translation of Search Report.

International Search Report and Written Opinion issued for International Patent Application No. PCT/JP2018/022491, Date of mailing: Sep. 11, 2018, 10 pages including English translation of Search Report.

* cited by examiner

LIGHT-ABSORBING COMPOSITION, LIGHT-ABSORBING FILM, AND OPTICAL FILTER

TECHNICAL FIELD

The present invention relates to a light-absorbing composition, a light-absorbing film, and an optical filter.

BACKGROUND ART

In imaging apparatuses employing a solid-state image sensing device such as a charge coupled device (CCD) or a complementary metal oxide semiconductor (CMOS), any of various optical filters is disposed ahead of the solid-state image sensing device in order to obtain an image with good color reproduction. Solid-state image sensing devices generally have spectral sensitivity over a wide wavelength range extending from the ultraviolet to infrared regions. On the other hand, the visual sensitivity of humans lies solely in the visible region. Thus, a technique is known in which an optical filter blocking a portion of infrared light or ultraviolet light is disposed ahead of a solid-state image sensing device in an imaging apparatus. The technique allows the spectral sensitivity of the solid-state image sensing device to approximate to the visual sensitivity of humans.

It has been common for such an optical filter to block infrared light or ultraviolet light by means of light reflection by a dielectric multilayer film. In recent years, optical filters including a film containing a light absorber have been attracting attention. The transmittance properties of optical filters including a film containing a light absorber are unlikely to be dependent on the incident angle, and this makes it possible to obtain favorable images with less color change even when light is obliquely incident on the optical filters in imaging apparatuses. Good backlit or nightscape images are more likely to be obtained using optical filters of light-absorbing type not including a light-reflecting film because such optical filters can reduce occurrence of ghosting and flare caused by multiple reflection in the light-reflecting film. Moreover, optical filters including a light absorber-including film are advantageous also in terms of size reduction and thickness reduction of imaging apparatuses.

Light absorbers made of a phosphonic acid and copper ion are known as light absorbers for such use. For example, Patent Literature 1 describes an optical filter including a light-absorbing layer including a light absorber made of a phosphonic acid having a phenyl group or a halogenated phenyl group and copper ion.

Patent Literature 2 describes an optical filter including a UV-IR absorbing layer capable of absorbing infrared light and ultraviolet light. The UV-IR absorbing layer includes a UV-IR absorber made of a phosphonic acid and copper ion. A UV-IR absorbing composition includes, for example, a phenyl-based phosphonic acid and an alkyl-based phosphonic acid so that the optical filter will satisfy predetermined optical properties.

CITATION LIST

Patent Literature

Patent Literature 1: JP 6339755 B1
Patent Literature 2: JP 6232161 B1

SUMMARY OF INVENTION

Technical Problem

For the optical filter described in Patent Literature 1, the UV cut-off wavelength is less than 400 nm. Moreover, the technique described in Patent Literature 1 is capable of improvement in light absorption performance in the wavelength range of more than 1000 nm. On the other hand, according to the technique described in Patent Literature 2, the UV-IR absorbing composition includes the phenyl-based phosphonic acid and the alkyl-based phosphonic acid so that the optical filter will satisfy given optical properties.

Therefore, the present disclosure provides a light-absorbing composition advantageous in providing a light-absorbing film having desired optical properties even when the light-absorbing film includes neither a phenyl-based phosphonic acid nor an alkyl-based phosphonic acid. The present invention also provides such a light-absorbing film and an optical filter including such a light-absorbing film.

Solution to Problem

The present invention provides a light-absorbing composition including:
a light absorber made of a phosphonic acid represented by the following formula (A) and copper ion; and
a curable resin, where $R_1$ to $R_5$ are each independently a hydrogen atom, a halogen atom, a hydroxy group, or a nitro group, and n represents an integer of 1 to 3.

The present invention provides a light-absorbing film including:
a light absorber made of a phosphonic acid represented by the following formula (A) and copper ion; and
a cured product of a curable resin, where $R_1$ to $R_5$ are each independently a hydrogen atom, a halogen atom, a hydroxy group, or a nitro group, and n represents an integer of 1 to 3.

The present invention also provides an optical filter including the above light-absorbing film.

Advantageous Effects of Invention

The above light-absorbing composition is advantageous in providing a light-absorbing film having desired optical properties. The above light-absorbing film and the above optical filter are likely to have desired optical properties.

DESCRIPTION OF EMBODIMENTS

A light absorber made of a phenyl-based phosphonic acid and copper ion is likely to have a property of absorbing light in the wavelength range of ultraviolet light and in the wavelength range of near-infrared light with a relatively short wavelength. On the other hand, a light absorber made of an alkyl-based phosphonic acid and copper ion is likely to have a property of absorbing light in the wavelength range of near-infrared light with a relatively long wavelength. For this reason, for example, a light-absorbing composition including a phenyl-based phosphonic acid and an alkyl-based phosphonic acid is used in some cases in order to achieve desired spectral transmittances of optical filters used for imaging apparatus.

The present inventors made intensive studies to develop a light-absorbing film having the desired optical properties without including these specific phosphonic acids and not by combining different light-absorbing compositions having different absorption properties. As a result, the present inventors have newly found that a light-absorbing composition including a light absorber made of a given phosphonic acid and copper ion is advantageous in achieving a light-absorbing film having desired optical properties. On the basis of this new finding, the present inventors have invented the light-absorbing composition according to the present invention.

Hereinafter, embodiments of the present invention will be described. The following description is directed to some examples of the present invention, and the present invention is not limited by these examples.

The light-absorbing composition according to the present invention includes a light absorber and a curable resin. The light absorber is made of a phosphonic acid represented by the following formula (A) and copper ion.

(A)

[In the formula (A), $R_1$ to $R_5$ are each independently a hydrogen atom, a halogen atom, a hydroxy group, or a nitro group, and n represents an integer of 1 to 3.]

The phosphonic acid represented by the formula (A) is, for example, a phosphonic acid having an aralkyl group. The phosphonic acid represented by the formula (A) has, in the molecular structure thereof, a cyclic hydrocarbon group which is a benzene ring and a non-cyclic hydrocarbon group. It can therefore be thought that the light absorber have a light-absorption-related characteristic of each functional group. As a result, the light-absorbing composition is advantageous in achieving a light-absorbing film having desired optical properties. It should be noted that an aralkyl group is an alkyl group ($-C_{n'}H_{2n'+1}$ (n' represents an integer of one or more)) in which one hydrogen atom thereof is substituted by an aryl group such as a phenyl group. Specific examples of the aralkyl group include groups such as a benzyl group (phenylmethyl group ($-CH_2-C_6H_5$ (in the formula (A), n=1))) and a phenethyl group (phenylethyl group ($-C_2H_4-C_6H_5$ (in the formula (A), n=2))).

The phosphonic acid represented by the formula (A) is, for example, a phosphonic acid having a benzyl group, a halogenated benzyl group in which at least one hydrogen atom of a benzene ring of a benzyl group is substituted by a halogen atom, a hydroxybenzyl group in which at least one hydrogen atom of a benzene ring of a benzyl group is substituted by a hydroxy group, or a nitrobenzyl group in which at least one hydrogen atom of a benzene ring of a benzyl group is substituted by a nitro group. The phosphonic acid represented by the formula (A) may be a phosphonic acid having a phenethyl group, a halogenated phenethyl group in which at least one hydrogen atom of a benzene ring of a phenethyl group is substituted by a halogen atom, a hydroxyphenethyl group in which at least one hydrogen atom of a benzene ring of a phenethyl group is substituted by a hydroxy group, or a nitrophenethyl group in which at least one hydrogen atom of a benzene ring of a phenethyl group is substituted by a nitro group. These are examples of the phosphonic acid represented by the formula (A).

In the phosphonic acid represented by the formula (A), either an aralkyl group or a modified aralkyl group, such as a benzyl group, a halogenated benzyl group, a hydroxybenzyl group, a nitrobenzyl group, a phenethyl group, a halogenated phenethyl group, a hydroxyphenethyl group, or a nitrophenethyl group is, for example, directly bonded to a phosphorus atom. In the phosphonic acid represented by the formula (A), there may further be a hydrocarbon group having 1 to 3 carbon atoms between any of these aralkyl groups or the modified aralkyl group and a phosphorus atom.

The phosphonic acid represented by the formula (A) is, for example, at least one selected from the group consisting of benzylphosphonic acid, fluorobenzylphosphonic acid, difluorobenzylphosphonic acid, chlorobenzylphosphonic acid, dichlorobenzylphosphonic acid, bromobenzylphosphonic acid, dibromobenzylphosphonic acid, iodobenzylphosphonic acid, diiodobenzylphosphonic acid, hydroxybenzylphosphonic acid, nitrobenzylphosphonic acid, phenethylphosphonic acid, fluorophenethylphosphonic acid, difluorophenethylphosphonic acid, chlorophenethylphosphonic acid, dichlorophenethylphosphonic acid, bromophenethylphosphonic acid, dibromophenethylphosphonic acid, iodophenethylphosphonic acid, diiodophenethylphosphonic acid, hydroxyphenethylphosphonic acid, and nitrophenethylphosphonic acid.

In the light-absorbing composition, a ratio of a content of the phosphonic acid represented by the formula (A) to a content of the copper ion is not limited to a particular value.

The ratio is, for example, 0.7 to 0.9 on an amount-of-substance basis. In this case, a light-absorbing film having desired optical properties is more easily achieved using the light-absorbing composition.

In the light-absorbing composition, the ratio of the content of the phosphonic acid represented by the formula (A) to the content of the copper ion is desirably 0.75 to 0.85.

The light-absorbing composition may include a light absorber made of a phosphonic acid other than the phosphonic acid represented by the formula (A) and copper ion. In this case, the phosphonic acid other than the phosphonic acid represented by the formula (A) is a phosphonic acid represented by the following formula (B). The phosphonic acid represented by the formula (B) may be a phosphonic acid having an alkyl group, such as methylphosphonic acid, ethylphosphonic acid, or butylphosphonic acid, or a phosphonic acid having a phenyl group (including a halogenated phenyl group in which one or some of hydrogen atoms of a benzene ring is substituted by a halogen atom). It is expected that on the basis of a characteristic of the light absorber made of the phosphonic acid represented by the formula (B) and the copper component, performance corresponding to the characteristic is promoted.

(B)

[In the formula (B), $R_{21}$ represents an alkyl group, a phenyl group, a halogenated alkyl group or halogenated phenyl group in which at least one hydrogen atom is substituted by a halogen atom, a nitrophenyl group, or a hydroxyphenyl group.]

A light-absorbing film obtained by curing a coating film of the light-absorbing composition satisfies, for example, the following requirements (i) to (iii) when light with a wavelength of 300 nm to 1200 nm is incident thereon at an incident angle of 0°:
  (i) a UV cut-off wavelength which lies in the wavelength range of 350 nm to 450 nm and at which a spectral transmittance is 50% is in the wavelength range of 400 nm to 450 nm;
  (ii) an IR cut-off wavelength which lies in the wavelength range of 600 nm to 750 nm and at which a spectral transmittance is 50% is in the wavelength range of 700 nm or less; and
  (iii) a difference $\Delta T_{50\%}$ determined by subtracting the UV cut-off wavelength from the IR cut-off wavelength is 240 nm or more.

The light-absorbing film obtained by curing a coating film of the light-absorbing composition further satisfies, for example, the following requirements (iv) to (vii) when light with a wavelength of 300 nm to 1200 nm is incident thereon at an incident angle of 0:
  (iv) a spectral transmittance is 1% or less in the wavelength range of 300 nm to 350 nm;
  (v) an average transmittance in the wavelength range of 450 nm to 600 nm is 75% or more;
  (vi) a spectral transmittance is 10% or less in the wavelength range of 800 nm to 1100 nm; and
  (vii) a spectral transmittance is 15% or less in the wavelength range of 800 nm to 1150 nm.

Typically, the light absorber is dispersed in the light-absorbing composition. For example, fine particles containing at least the light absorber are present in the light-absorbing composition. The average particle diameter of the fine particles is, for example, 5 nm to 200 nm. When the average particle diameter of the fine particles is 5 nm or more, no particular ultramicronization process is required to obtain the fine particles, and the risk of structural destruction of the fine particles containing at least the light absorber is low. Additionally, the fine particles are well dispersed in the light-absorbing composition. When the average particle diameter of the fine particles is 200 nm or less, it is possible to reduce the influence of Mie scattering, increase the visible transmittance of a light-absorbing film, and prevent deterioration of properties, such as contrast and haze, of an image captured by an imaging apparatus. The average particle diameter of the fine particles is desirably 100 nm or less. In this case, the influence of Rayleigh scattering is reduced, and thus a light-absorbing film formed using the light-absorbing composition has an increased transparency to visible light. The average particle diameter of the fine particles is more desirably 75 nm or less. In this case, a light-absorbing film produced using the light-absorbing composition has especially high transparency to visible light. The average particle diameter of the fine particles can be measured by a dynamic light scattering method.

In the light-absorbing composition, the curable resin is not limited to a particular resin. The curable resin is, for example, a silicone resin.

The curable resin is desirably a silicone resin containing an aryl group such as a phenyl group. If the resin included in a light-absorbing film is excessively hard (rigid), the likelihood of cure-shrinkage-induced cracking during production of the light-absorbing film increases with increasing thickness of a layer including the resin. When the curable resin is the silicone resin containing an aryl group, a light-absorbing film formed of the light-absorbing composition is likely to have high crack resistance. The silicone resin containing an aryl group has high compatibility with the phosphonic acid represented by the formula (A) and reduces the likelihood of aggregation of the light absorber. Specific examples of the silicone resin available as a matrix resin include KR-255, KR-300, KR-2621-1, KR-211, KR-311, KR-216, KR-212, KR-251, and KR-5230. All of these are silicone resins manufactured by Shin-Etsu Chemical Co., Ltd.

The light-absorbing composition may further include, for example, a phosphoric acid ester. The light absorber is likely to be dispersed appropriately in the light-absorbing composition or a light-absorbing film obtained by curing the light-absorbing composition by action of the phosphoric acid ester.

The phosphoric acid ester is, for example, a phosphoric acid ester having a polyoxyalkyl group. The phosphoric acid ester having a polyoxyalkyl group is not limited to a particular phosphoric acid ester. The phosphoric acid ester having a polyoxyalkyl group is, for example, PLYSURF A208N (polyoxyethylene alkyl (C12, C13) ether phosphoric acid ester), PLYSURF A208F (polyoxyethylene alkyl (C8) ether phosphoric acid ester), PLYSURF A208B (polyoxyethylene lauryl ether phosphoric acid ester), PLYSURF A219B (polyoxyethylene lauryl ether phosphoric acid ester), PLYSURF AL (polyoxyethylene styrenated phenylether phosphoric acid ester), PLYSURF A212C (polyoxyethylene tridecyl ether phosphoric acid ester), or PLYSURF A215C (polyoxyethylene tridecyl ether phosphoric acid ester). All of these are products manufactured by DKS Co., Ltd. The phosphoric acid ester may be, for example, NIKKOL DDP-2 (polyoxyethylene alkyl ether phosphoric acid ester), NIKKOL DDP-4 (polyoxyethylene alkyl ether phosphoric acid ester), or NIKKOL DDP-6 (polyoxyethylene alkyl ether phosphoric acid ester). All of these are products manufactured by Nikko Chemicals Co., Ltd.

The light-absorbing composition may further include an alkoxysilane, if necessary. In this case, a light-absorbing film is likely to have a dense structure because a siloxane bond (—Si—O—Si—) is formed by hydrolysis-polycondensation of the alkoxysilane. The alkoxysilane may be a monomer, may be in the form of an oligomer or polymer in which the hydrolysis and the polycondensation have progressed to some degree, or may be a mixture thereof.

An exemplary method for preparing the light-absorbing composition will be described. A copper salt such as copper acetate monohydrate is added to a given solvent such as tetrahydrofuran (THF), and the mixture is stirred to prepare a solution A which is a copper salt solution. The phosphoric acid ester may be added to prepare the solution A. Next, the phosphonic acid represented by the formula (A), such as benzylphosphonic acid, is added to a given solvent such as THF, and the mixture is stirred to prepare a solution B. When a plurality of types of phosphonic acids are used, the solution B may be prepared by adding each phosphonic acid to a given solvent such as THF, stirring the mixture, and mixing a plurality of preliminary liquids each prepared to contain a different phosphonic acid. The solution B is added to the solution A while the solution A is stirred, and the mixture is stirred for a given period of time. To the resulting solution is then added a given solvent such as toluene, and the mixture is stirred to obtain a solution C.

Subsequently, the solution C is subjected to solvent removal under heating for a given period of time to obtain a solution D. This process removes the solvent such as THF and a component, such as acetic acid (boiling point: about 118° C.), generated by disassociation of the copper salt, yielding a light absorber made of the phosphonic acid represented by the formula (A) and copper ion. The temperature at which the solution C is heated is determined on the basis of the boiling point of the to-be-removed component disassociated from the copper salt. During the solvent removal, the solvent such as toluene (boiling point: about 110° C.) used to obtain the solution C is also evaporated. A certain amount of this solvent desirably remains in the light-absorbing composition. This is preferably taken into account in determining the amount of the solvent to be added and the time period of the solvent removal. To obtain the solution C, o-xylene (boiling point: about 144° C.) can be used instead of toluene. In this case, the amount of o-xylene to be added can be reduced to about one-fourth of the amount of toluene to be added, because the boiling point of o-xylene is higher than the boiling point of toluene.

Next, the solution D and the curable resin such as the silicone resin are mixed and stirred for a given period of time. The light-absorbing composition can thus be prepared.

Figure 1:
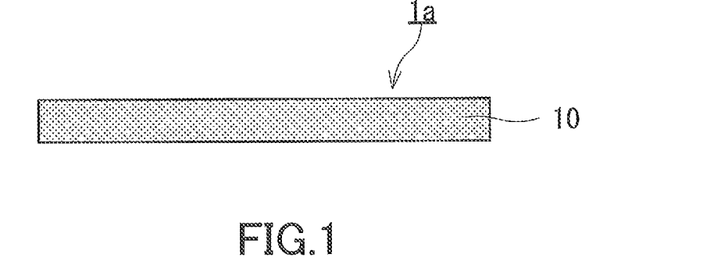
FIG. 1 is a cross-sectional view showing an example of the light-absorbing film according to the present invention.

For example, a light-absorbing film 10 shown in FIG. 1 can be provided using the light-absorbing composition. The light-absorbing film 10 includes, for example, the light absorber made of the phosphonic acid represented by the above formula (A) and copper ion and a cured product of the curable resin. Typically, the light absorber is dispersed in the cured product. The light-absorbing film 10 can be obtained, for example, by curing a coating film of the light-absorbing composition.

In the light-absorbing film 10, the ratio of the content of the phosphonic acid represented by the formula (A) to the content of the copper ion is 0.7 to 0.9 on an amount-of-substance basis. The ratio is desirably 0.75 to 0.85.

The light-absorbing film 10 satisfies, for example, the above requirements (i) to (iii) when light with a wavelength of 300 nm to 1200 nm is incident thereon at an incident angle of 0°.

As the light-absorbing film 10 satisfies the requirement (i), light in a wavelength band on the shorter wavelength side of a wavelength corresponding to a limit of the visual sensitivity of humans is well blocked. Additionally, the capability of effectively cutting off ultraviolet light near the lower limit (at around 400 nm) of the visible region is advantageous in view of a recent change in sensitivity of a sensor of an image sensing device, particularly improvement in sensitivity of a sensor in a wavelength band on the ultraviolet side. From this point of view as well, the light-absorbing film 10 desirably satisfies the requirement (i). As to the requirement (i), the UV cut-off wavelength is desirably in the wavelength range of 400 nm to 430 nm for the light-absorbing film 10. As to the requirement (i), for example, the spectral transmittance of the light-absorbing film 10 increases in the wavelength range of 350 nm to 450 nm with an increasing wavelength.

As the light-absorbing film 10 satisfies the requirement (ii), light in a wavelength band on the longer wavelength side of a wavelength corresponding to a limit of the visual sensitivity of humans is well blocked. As to the requirement (ii), the IR cut-off wavelength is desirably at a wavelength of 690 nm or less for the light-absorbing film 10. As to the requirement (ii), for example, the spectral transmittance of the light-absorbing film 10 decreases in the wavelength range of 600 nm to 750 nm with an increasing wavelength.

As the light-absorbing film 10 satisfies the requirement (iii), a wavelength band in which the transmittance of the light-absorbing film 10 is 50% or more is likely to coincide with a wavelength band corresponding to the range of the visual sensitivity of humans. As to the requirement (iii), the difference $\Delta T_{50\%}$ is desirably 250 nm or more and more desirably 260 nm or more for the light-absorbing film 10.

The light-absorbing film 10 further satisfies, for example, the above requirements (iv) to (vii) when light with a wavelength of 300 nm to 1200 nm is incident thereon at an incident angle of 0°.

As the light-absorbing film 10 satisfies the requirement (iv), light in the ultraviolet region which is out of the range of the visual sensitivity of humans can be effectively cut off. As to the requirement (iv), the light-absorbing film 10 desirably has a spectral transmittance of 1% or less in the wavelength range of 300 nm to 360 nm.

As the light-absorbing film 10 satisfies the requirement (v), the transmittance of light in the visible region is high. This is advantageous in forming an image using an image sensing device. As to the requirement (v), the average transmittance in the wavelength range of 450 nm to 600 nm is desirably 78% or more and more desirably 80% or more for the light-absorbing film 10.

As the light-absorbing film 10 satisfies the requirements (vi) and (vii), light in the infrared region which is out of the range of the visual sensitivity of humans can be effectively cut off. As to the requirement (vi), the spectral transmittance is desirably 5% or less and more desirably 3% or less in the wavelength range of 800 nm to 1100 nm for the light-absorbing film 10. As to the requirement (vii), the spectral transmittance is desirably 10% or less and more desirably 5% or less in the wavelength range of 800 nm to 1150 nm for the light-absorbing film 10.

As shown in FIG. 1, an optical filter 1a including the light-absorbing film 10 can be provided.

The optical filter 1a satisfies, for example, the following requirements (I) to (III), for example, when light with a wavelength of 300 nm to 1200 nm is incident thereon at an incident angle of 0:

(I) a UV cut-off wavelength which lies in the wavelength range of 350 nm to 450 nm and at which a spectral transmittance is 50% is in the wavelength range of 400 nm to 450 nm;

(II) an IR cut-off wavelength which lies in the wavelength range of 600 nm to 750 nm and at which a spectral transmittance is 50% is in the wavelength range of 700 nm or less; and (III) a difference $\Delta T_{50\%}$ determined by subtracting the UV cut-off wavelength from the IR cut-off wavelength is 240 nm or more.

As to the requirement (I), the UV cut-off wavelength is desirably in the wavelength range of 400 nm to 430 nm for the optical filter 1a. As to the requirement (I), for example, the spectral transmittance of the optical filter 1a increases in the wavelength range of 350 nm to 450 nm with an increasing wavelength.

As to the requirement (II), the IR cut-off wavelength is desirably at a wavelength of 690 nm or less for the optical filter 1a. As to the requirement (II), for example, the spectral transmittance of the optical filter 1a decreases in the wavelength range of 600 nm to 750 nm with an increasing wavelength.

As to the requirement (III), the difference $\Delta T_{50\%}$ is desirably 250 nm or more and more desirably 260 nm or more for the optical filter 1a.

The optical filter 1a further satisfies, for example, the following requirements (IV) to (VII) when light with a wavelength of 300 nm to 1200 nm is incident thereon at an incident angle of 0:

(IV) a spectral transmittance is 1% or less in the wavelength range of 300 nm to 350 nm;

(V) an average transmittance in the wavelength range of 450 nm to 600 nm is 75% or more;

(VI) a spectral transmittance is 10% or less in the wavelength range of 800 nm to 1100 nm; and (VII) a spectral transmittance is 15% or less in the wavelength range of 800 nm to 1150 nm.

As to the requirement (IV), the optical filter 1a desirably has a spectral transmittance of 1% or less in the wavelength range of 300 nm to 360 nm.

As to the requirement (V), the average transmittance in the wavelength range of 450 nm to 600 nm is desirably 78% or more and more desirably 80% or more for the optical filter 1a.

As to the requirement (VI), the spectral transmittance is desirably 5% or less and more desirably 3% or less in the wavelength range of 800 nm to 1100 nm for the optical filter 1a. As to the requirement (VII), the spectral transmittance is desirably 10% or less and more desirably 5% or less in the wavelength range of 800 nm to 1150 nm for the optical filter 1a.

The optical filter 1a may be configured, for example, of the light-absorbing film 10 only. In this case, the optical filter 1a is, for example, used independently of an image sensing device or an optical component. The optical filter 1a may be bonded to an image sensing device or an optical component. Alternatively, the optical filter 1a may be configured by applying the above light-absorbing composition to an image sensing device or an optical component and curing the light-absorbing composition.

The optical filter 1a can be produced, for example, by peeling the light-absorbing film 10 formed on a substrate from the substrate. In this case, the material of the substrate may be a glass, a resin, or a metal. A surface of the substrate may be subjected to surface treatment such as coating using a fluorine-including compound.

Figure 2:
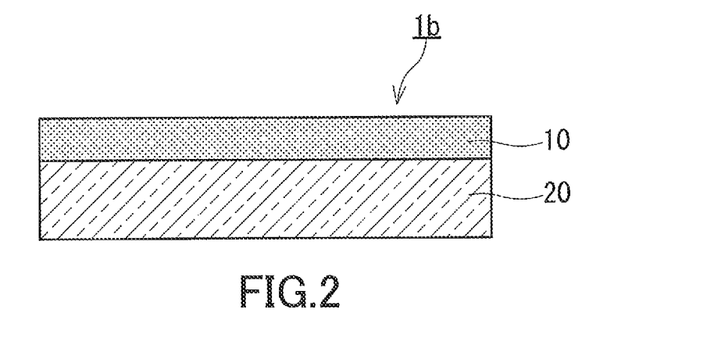
FIG. 2 is a cross-sectional view showing an example of the optical filter according to the present invention.

The optical filter 1a may be modified, for example, to an optical filter 1b shown in FIG. 2. The optical filter 1b is configured in the same manner as the optical filter 1a, unless otherwise described. The components of the optical filter 1b that are the same as or correspond to the components of the optical filter 1a are denoted by the same reference characters, and detailed descriptions of such components are omitted. The description given for the optical filter 1a can apply to the optical filter 1b, unless there is technical inconsistency.

As shown in FIG. 2, the optical filter 1b includes the light-absorbing film 10 and a transparent dielectric substrate 20. The light-absorbing film 10 is arranged in parallel to one principal surface of the transparent dielectric substrate 20. The light-absorbing film 10 may be, for example, in contact with one principal surface of the transparent dielectric substrate 20. In this case, for example, the light-absorbing film 10 is formed by applying the above light-absorbing composition to the one principal surface of the transparent dielectric substrate 20 and curing the light-absorbing composition.

The type of the transparent dielectric substrate 20 is not limited to a particular type. The transparent dielectric substrate 20 may have the ability to absorb light in the infrared region. The transparent dielectric substrate 20 may have, for example, an average spectral transmittance of 90% or more between wavelengths of 350 nm to 900 nm. The material of the transparent dielectric substrate 20 is not limited to a particular material, and is, for example, a certain type of a glass or a resin. When the material of the transparent dielectric substrate 20 is a glass, the transparent dielectric substrate 20 is made of, for example, a transparent glass being a silicate glass such as soda-lime glass or borosilicate glass or an infrared cut glass. The infrared cut glass is, for example, a phosphate glass or fluorophosphate glass containing CuO.

When the material of the transparent dielectric substrate 20 is a resin, the resin is, for example, a cyclic olefin resin such as a norbornene resin, a polyarylate resin, an acrylic resin, a modified acrylic resin, a polyimide resin, a polyetherimide resin, a polysulfone resin, a polyethersulfone resin, a polycarbonate resin, or a silicone resin.

The optical filters 1a and 1b may be modified to further include another functional film such as an infrared-reflecting film.

EXAMPLES

The present invention will be described in more detail by examples. The present invention is not limited to the examples given below.

Example 1

(Preparation of Light-Absorbing Composition)

4.500 g of copper acetate monohydrate and 240 g of tetrahydrofuran (THF) were mixed, and the mixture was stirred for 3 hours to obtain a copper acetate solution. To the obtained copper acetate solution was then added 4.333 g of PLYSURF A208N (manufactured by DKS Co., Ltd.) which is a phosphoric acid ester compound, and the mixture was stirred for 30 minutes to obtain a solution A1. 120 g of THF was added to 3.144 g of benzylphosphonic acid (manufactured by FUJIFILM Wako Pure Chemical Corporation), and the mixture was stirred for 30 minutes to obtain a solution B1. The solution B1 was added to the solution A1 while the solution A1 was stirred, and the mixture was stirred at room temperature for 1 minute. To the resulting solution was then added 120 g of toluene, and the mixture was stirred at room temperature for 1 minute to obtain a solution C1. This solution C1 was put in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100). The temperature of the oil bath was controlled to 105° C. A liquid which had been subjected to the solvent removal was then collected from the flask to obtain a solution D1 which is a dispersion liquid of a light absorber made of benzylphosphonic acid and copper ion.

To the solution D1 was added 8.80 g of a silicone resin (manufactured by Shin-Etsu Chemical Co., Ltd.; product name: KR-300), and the mixture was stirred for 30 minutes to obtain a light-absorbing composition according to Example 1 including the light absorber made of benzylphosphonic acid and copper ion. In the light-absorbing composition according to Example 1, the mass ratio of the content of the benzylphosphonic acid to the content of the phosphoric acid ester compound was 0.726, and the molar ratio of the content of the benzylphosphonic acid to the content of the copper ion was 0.810.

(Production of Optical Filter)

The light-absorbing composition according to Example 1 was applied with a dispenser to a 40 mm×40 mm region at a central portion of one principal surface of a transparent glass substrate (manufactured by SCHOTT AG; product name: D 263 T eco) made of borosilicate glass and having dimensions of 76 mm×76 mm×0.21 mm to form a coating film. After sufficiently dried at room temperature, the coating film was put in an oven and subjected to heat treatment at 45° C. for 2 hours and then at 85° C. for 30 minutes to evaporate the solvent. The coating film was further subjected to baking treatment at 125° C. for 3 hours, at 150° C. for 1 hour, and then at 170° C. for 3 hours to sufficiently cure the coating film. A light-absorbing film according to Example 1 was formed in this manner to obtain an optical filter according to Example 1.

Example 2

4.500 g of copper acetate monohydrate and 240 g of tetrahydrofuran (THF) were mixed, and the mixture was stirred for 3 hours to obtain a copper acetate solution. To the obtained copper acetate solution was then added 4.333 g of PLYSURF A208N (manufactured by DKS Co., Ltd.) which is a phosphoric acid ester compound, and the mixture was stirred for 30 minutes to obtain a solution A2. 120 g of THF was added to 3.774 g of 4-chlorobenzylphosphonic acid (manufactured by Johoku Chemical Co., Ltd.), and the mixture was stirred for 30 minutes to obtain a solution B2. The solution B2 was added to the solution A2 while the solution A2 was stirred, and the mixture was stirred at room temperature for 1 minute. To the resulting solution was then added 120 g of toluene, and the mixture was stirred at room temperature for 1 minute to obtain a solution C2. This solution C2 was put in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100). The temperature of the oil bath was controlled to 105° C. A liquid which had been subjected to the solvent removal was then collected from the flask to obtain a solution D2 which is a dispersion liquid of a light absorber made of 4-chlorobenzylphosphonic acid and copper ion.

To the solution D2 was added 8.80 g of a silicone resin (manufactured by Shin-Etsu Chemical Co., Ltd.; product name: KR-300), and the mixture was stirred for 30 minutes to obtain a light-absorbing composition according to Example 2 including the light absorber made of 4-chlorobenzylphosphonic acid and copper ion. In the light-absorbing composition according to Example 2, the mass ratio of the content of the 4-chlorobenzylphosphonic acid to the content of the phosphoric acid ester compound was 0.871, and the molar ratio of the content of the 4-chlorobenzylphosphonic acid to the content of the copper ion was 0.811.

The light-absorbing composition according to Example 2 was applied with a dispenser to a 40 mm×40 mm region at a central portion of one principal surface of a transparent glass substrate (manufactured by SCHOTT AG; product name: D 263 T eco) made of borosilicate glass and having dimensions of 76 mm×76 mm×0.21 mm to form a coating film. After sufficiently dried at room temperature, the coating film was put in an oven and subjected to heat treatment at 45° C. for 2 hours and then at 85° C. for 30 minutes to evaporate the solvent. The coating film was further subjected to baking treatment at 125° C. for 3 hours, at 150° C. for 1 hour, and then at 170° C. for 3 hours to sufficiently cure the coating film. A light-absorbing film according to Example 2 was formed in this manner to obtain an optical filter according to Example 2.

Example 3

4.500 g of copper acetate monohydrate and 240 g of tetrahydrofuran (THF) were mixed, and the mixture was stirred for 3 hours to obtain a copper acetate solution. To the obtained copper acetate solution was then added 4.333 g of PLYSURF A208N (manufactured by DKS Co., Ltd.) which is a phosphoric acid ester compound, and the mixture was stirred for 30 minutes to obtain a solution A3. 120 g of THF was added to 3.774 g of 4-chlorobenzylphosphonic acid (manufactured by Johoku Chemical Co., Ltd.), and the mixture was stirred for 30 minutes to obtain a solution B3. The solution B3 was added to the solution A3 while the solution A3 was stirred, and the mixture was stirred at room temperature for 1 minute. To the resulting solution was then added 120 g of toluene, and the mixture was stirred at room temperature for 1 minute to obtain a solution C3. This solution C3 was put in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100). The temperature of the oil bath was controlled to 105° C. A liquid which had been subjected to the solvent removal was then collected from the flask to obtain a solution D3 which is a dispersion liquid of a light absorber made of 4-chlorobenzylphosphonic acid and copper ion. In the solution D3, the mass ratio of the content of the 4-chlorobenzylphosphonic acid to the content of the phosphoric acid ester compound was 0.871, and the molar ratio of the content of the phosphonic acid to the content of the copper ion was 0.811.

4.500 g of copper acetate monohydrate and 240 g of tetrahydrofuran (THF) were mixed, and the mixture was stirred for 3 hours to obtain a copper acetate solution. To the obtained copper acetate solution was then added 2.572 g of PLYSURF A208N (manufactured by DKS Co., Ltd.) which is a phosphoric acid ester compound, and the mixture was stirred for 30 minutes to obtain a solution A4. 40 g of THF was added to 2.886 g of n-butylphosphonic acid, and the mixture was stirred for 30 minutes to obtain a solution B4. The solution B4 was added to the solution A4 while the solution A4 was stirred, and the mixture was stirred at room temperature for 1 minute. To the resulting solution was then added 100 g of toluene, and the mixture was stirred at room temperature for 1 minute to obtain a solution C4. This solution C4 was put in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100). The temperature of the oil bath was controlled to 105° C. A liquid which had been subjected to the solvent removal was then collected from the flask to obtain a solution D4 which is a dispersion liquid of a light absorber made of n-butylphosphonic acid and copper ion. In the solution D4, the mass ratio of the content of the n-butylphosphonic acid to the content of the phosphoric acid ester compound was 1.123, and the molar ratio of the content of the phosphonic acid to the content of the copper ion was 0.927.

To the solution D3 were added an amount of the solution D4 corresponding to 20 mass % of the total amount of the solution D4 and 8.80 g of a silicone resin (manufactured by Shin-Etsu Chemical Co., Ltd.; product name: KR-300), and the mixture was stirred for 30 minutes to obtain a light-absorbing composition according to Example 3 including the light absorbers made of 4-chlorobenzylphosphonic acid, n-butylphosphonic acid, and copper ion. In the light-absorbing composition according to Example 3, the mass ratio of the total content of the 4-chlorobenzylphosphonic acid and the n-butylphosphonic acid to the content of the phosphoric acid ester compound was 0.898, and the molar ratio of the total content of the 4-chlorobenzylphosphonic acid and the n-butylphosphonic acid to the content of the copper ion was 0.833.

The light-absorbing composition according to Example 3 was applied with a dispenser to a 40 mm×40 mm region at a central portion of one principal surface of a transparent glass substrate (manufactured by SCHOTT AG; product name: D 263 T eco) made of borosilicate glass and having dimensions of 76 mm×76 mm×0.21 mm to form a coating film. After sufficiently dried at room temperature, the coating film was put in an oven and subjected to heat treatment at 45° C. for 2 hours and then at 85° C. for 30 minutes to evaporate the solvent. The coating film was further subjected to baking treatment at 125° C. for 3 hours, at 150° C. for 1 hour, and then at 170° C. for 3 hours to sufficiently cure the coating film. A light-absorbing film according to Example 3 was formed in this manner to obtain an optical filter according to Example 3.

Comparative Example 1

4.500 g of copper acetate monohydrate and 240 g of tetrahydrofuran (THF) were mixed, and the mixture was stirred for 3 hours to obtain a copper acetate solution. To the obtained copper acetate solution was then added 7.172 g of PLYSURF A208F (manufactured by DKS Co., Ltd.) which is a phosphoric acid ester compound, and the mixture was stirred for 30 minutes to obtain a solution A5. 40 g of THF was added to 2.508 g of phenylphosphonic acid (manufactured by Nissan Chemical Industries, Ltd.), and the mixture was stirred for 30 minutes to obtain a solution B5. The solution B5 was added to the solution A5 while the solution A5 was stirred, and the mixture was stirred at room temperature for 1 minute. To the resulting solution was then added 180 g of toluene, and the mixture was stirred at room temperature for 1 minute to obtain a solution C5. This solution C5 was put in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100). The temperature of the oil bath was controlled to 120° C. A liquid which had been subjected to the solvent removal was then collected from the flask to obtain a solution D5 which is a dispersion liquid of a light absorber made of phenylphosphonic acid and copper ion.

To the solution D5 was added 17.60 g of a silicone resin (manufactured by Shin-Etsu Chemical Co., Ltd.; product name: KR-300), and the mixture was stirred for 30 minutes to obtain a light-absorbing composition according to Comparative Example 1 including the light absorber made of phenylphosphonic acid and copper ion. In the light-absorbing composition according to Comparative Example 1, the mass ratio of the content of the phenylphosphonic acid to the content of the phosphoric acid ester compound was 0.350, and the molar ratio of the content of the phenylphosphonic acid to the content of the copper ion was 0.704.

The light-absorbing composition according to Comparative Example 1 was applied with a dispenser to a 40 mm×40 mm region at a central portion of one principal surface of a transparent glass substrate (manufactured by SCHOTT AG; product name: D 263 T eco) made of borosilicate glass and having dimensions of 76 mm×76 mm×0.21 mm to form a coating film. After sufficiently dried at room temperature, the coating film was put in an oven and subjected to heat treatment at 85° C. for 3 hours to evaporate the solvent. The coating film was further subjected to baking treatment at 125° C. for 3 hours, at 150° C. for 1 hour, and then at 170° C. for 8 hours to sufficiently cure the coating film. A light-absorbing film according to Comparative Example 1 was formed in this manner to obtain an optical filter according to Comparative Example 1.

Comparative Example 2

4.500 g of copper acetate monohydrate and 240 g of tetrahydrofuran (THF) were mixed, and the mixture was stirred for 3 hours to obtain a copper acetate solution. To the obtained copper acetate solution was then added 4.333 g of PLYSURF A208F (manufactured by DKS Co., Ltd.) which is a phosphoric acid ester compound, and the mixture was stirred for 30 minutes to obtain a solution A6. 40 g of THF was added to 2.523 g of n-butylphosphonic acid (manufactured by Johoku Chemical Co., Ltd.), and the mixture was stirred for 30 minutes to obtain a solution B6. The solution B6 was added to the solution A6 while the solution A6 was stirred, and the mixture was stirred at room temperature for 1 minute. To the resulting solution was then added 120 g of toluene, and the mixture was stirred at room temperature for 1 minute to obtain a solution C6. This solution C6 was put in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100). The temperature of the oil bath was controlled to 105° C. A liquid which had been subjected to the solvent removal was then collected from the flask to obtain a solution D6 which is a dispersion liquid of a light absorber made of n-butylphosphonic acid and copper ion.

To the solution D6 was added 8.80 g of a silicone resin (manufactured by Shin-Etsu Chemical Co., Ltd.; product name: KR-300), and the mixture was stirred for 30 minutes to obtain a light-absorbing composition according to Comparative Example 2 including the light absorber made of n-butylphosphonic acid and copper ion. In the light-absorbing composition according to Comparative Example 2, the mass ratio of the content of the n-butylphosphonic acid to the content of the phosphoric acid ester compound was 0.582, and the molar ratio of the content of the n-butylphosphonic acid to the content of the copper ion was 0.811.

The light-absorbing composition according to Comparative Example 2 was applied with a dispenser to a 40 mm×40 mm region at a central portion of one principal surface of a transparent glass substrate (manufactured by SCHOTT AG; product name: D 263 T eco) made of borosilicate glass and having dimensions of 76 mm×76 mm×0.21 mm to form a coating film. After sufficiently dried at room temperature, the coating film was put in an oven and subjected to heat treatment at 45° C. for 2 hours and then at 85° C. for 30 minutes to evaporate the solvent. Baking treatment was further performed at 125° C. for 3 hours, at 150° C. for 1 hour, and then at 170° C. for 3 hours to sufficiently cure the coating film. A light-absorbing film according to Comparative Example 2 was formed in this manner to obtain an optical filter according to Comparative Example 2.

<Amounts of Materials Used>

Table 1 shows the amounts of materials used to prepare the light-absorbing compositions according to Examples 1 to 3 and Comparative Examples 1 and 2. Additionally, Table 1 shows the ratio of the content of the phosphoric acid to the content of the phosphoric acid ester in each light-absorbing composition on a mass basis and the ratio of the content of the phosphonic acid to the content of the copper ion in each light-absorbing composition on an amount-of-substance basis.

<Transmittance Spectrum Measurement>

The optical filters according to Examples and Comparative Examples were each measured for a transmittance spectrum at an incident angle of 0° using an ultraviolet/visible/near-infrared spectrophotometer (manufactured by JASCO Corporation; product name: V-670). FIGS. 3, 4, 5, 6, and 7 respectively show the transmittance spectra of the optical filters according to Examples 1 to 3 and Comparative Examples 1 and 2. Table 2 shows transmittance-related properties obtained from the transmittance spectra shown in FIGS. 3 to 7.

<Thickness Measurement>

Measurement of the thickness of each light-absorbing film was performed in which the distance to a surface of the optical filter was measured using a laser displacement meter (manufactured by Keyence Corporation; product name: LK-H008) and the thickness of the transparent glass substrate was subtracted. Table 2 shows the results.

Figure 3:
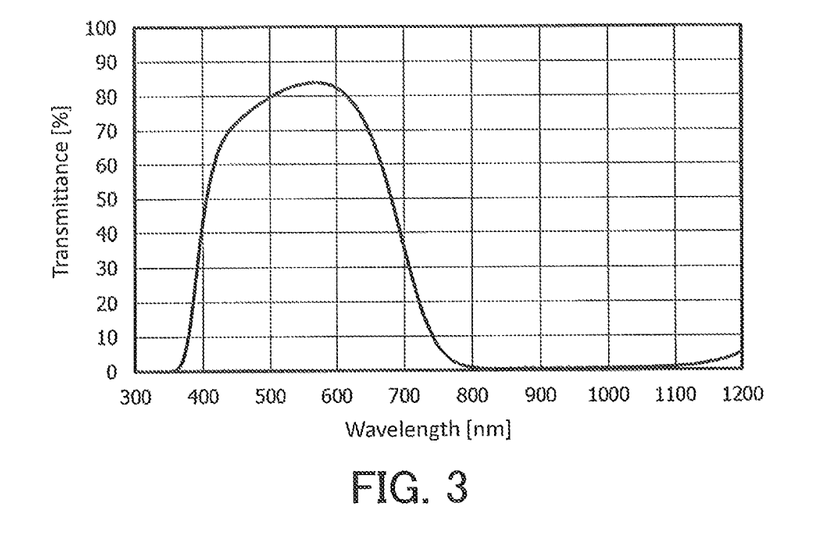
FIG. 3 is a transmittance spectrum of an optical filter according to Example 1.
Figure 4:
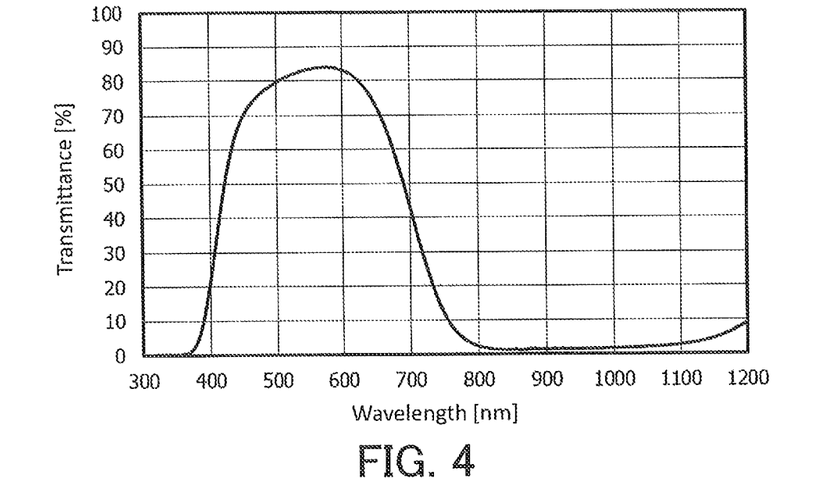
FIG. 4 is a transmittance spectrum of an optical filter according to Example 2.
Figure 5:
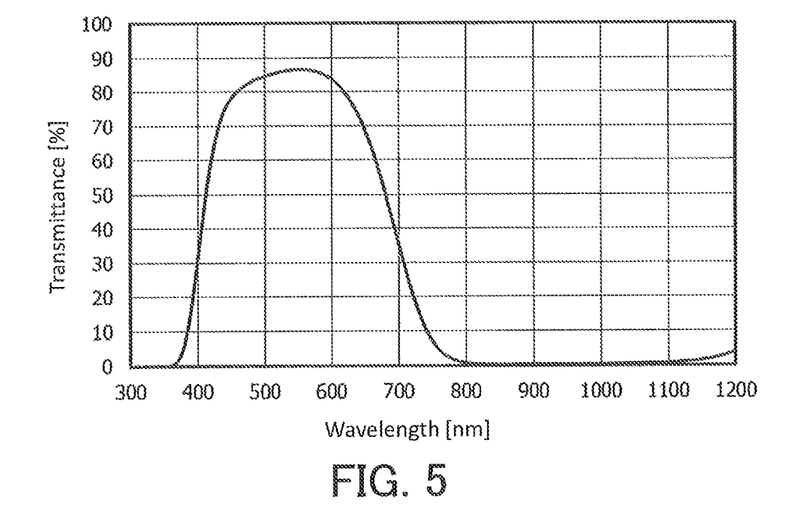
FIG. 5 is a transmittance spectrum of an optical filter according to Example 3.
Figure 6:
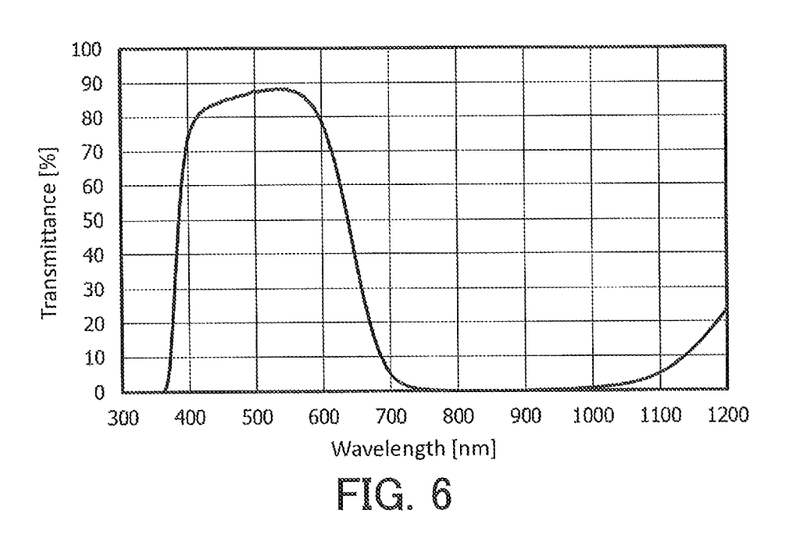
FIG. 6 is a transmittance spectrum of an optical filter according to Comparative Example 1.
Figure 7:
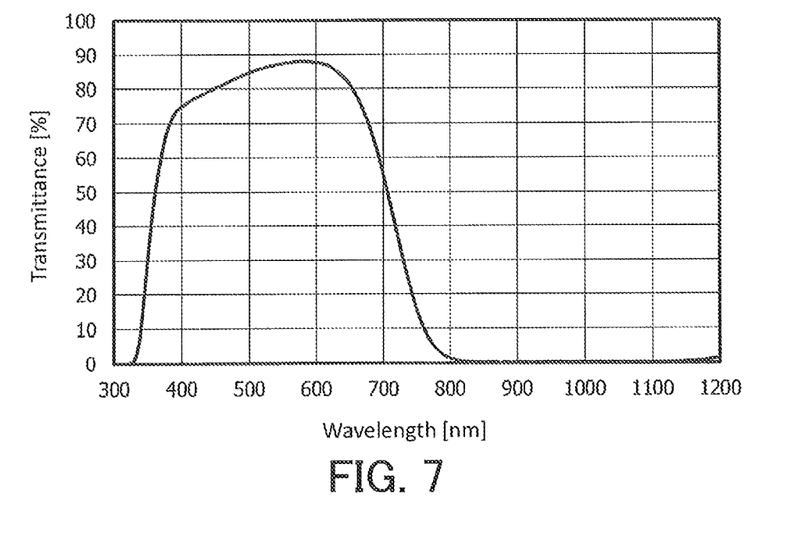
FIG. 7 is a transmittance spectrum of an optical filter according to Comparative Example 2.

As shown in FIGS. 3 to 5 and Table 2, the optical filters according to Examples 1 to 3 satisfy all of the above requirements (I) to (VII) of the transmittance spectra. Additionally, the transmittance properties of the transparent glass substrates suggest that the light-absorbing films according to Examples 1 to 3 satisfy all of the above requirements. On the other hand, the optical filter according to Comparative Example 1 does not satisfy the above requirement (II). The optical filter according to Comparative Example 2 does not satisfy the above requirements (I), (II), and (IV).

Figure 8:
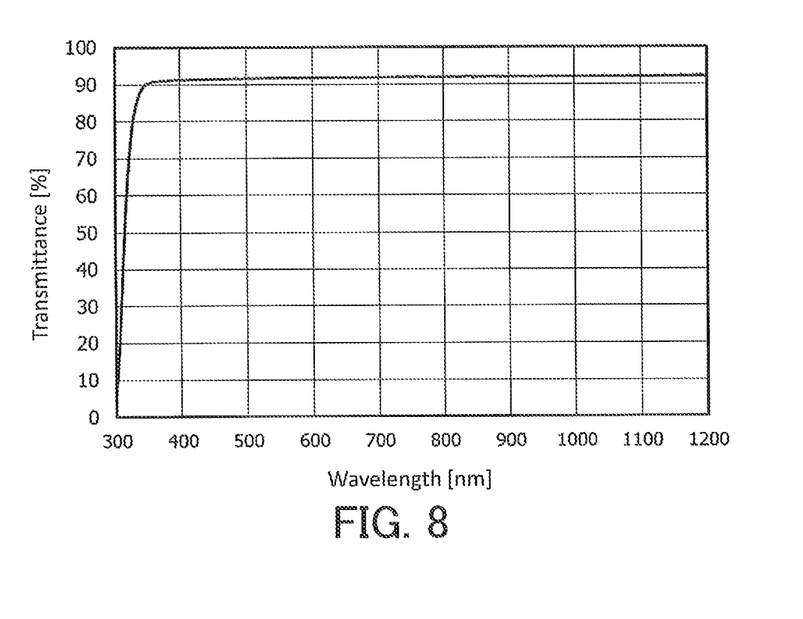
FIG. 8 is a transmittance spectrum of a transparent glass substrate.

Moreover, each of the optical filters according to Examples 1 to 3 can be used as an optical filter formed only of a light-absorbing film by peeling the light-absorbing film from the transparent glass substrate. FIG. 8 shows a transmittance spectrum of the transparent glass substrate. The fact that the transmittance spectrum of the transparent glass substrate shows almost no absorption in the wavelength range of about 350 nm or more (the transmittance is decreased to around 92% by Fresnel reflection at a surface) suggests that the optical filters formed only of a light-absorbing film can satisfy the above requirements (I) to (VII).

In the case where the light-absorbing film is to be peeled from the transparent glass substrate, example of a known method that can be used include, but are not limited to, application of a release agent, a mold release agent, or the like including, for example, a fluorine compound onto the transparent glass substrate before application of the light-absorbing composition thereto. Such process performed beforehand makes the peeling process easier. Furthermore, in the case of providing only the light-absorbing film as the optical filter, examples of the material of a base that can be used for formation of a coating film include, but are not limited to, a metal, a resin, and a fluorine-including resin.

Additionally, achievement of improving a transmittance in a predetermined wavelength range (for example, the visible region) by forming an antireflection film on a light-absorbing film or a transparent substrate where a light-absorbing film is formed is also a commonly used art of persons skilled in the art. The antireflection film may be configured as a layer formed of a low refractive index material such as $MgF_2$ or $SiO_2$ or as a laminate composed of a layer formed of the low refractive index material and a layer formed of a high refractive index material such as $TiO_2$, or may be a dielectric multilayer film. Such antireflection films are formed by a physical method such as vacuum deposition or sputtering or by a chemical method such as CVD or sol-gel process.

Additionally, the light-absorbing film according to the present invention is formed on a phosphate glass or fluorophosphate glass serving as a substrate and containing a coloring component such as Cu or Co. The substrate is, for example, an infrared absorbing glass. When an infrared absorbing glass where the light-absorbing film is formed is used, a light-absorbing filter showing a desired spectrum can be obtained by adjusting light absorption properties and spectra of both the infrared absorbing glass and the light-absorbing film.

The light-absorbing film according to the present invention is, for example, sandwiched between two pieces of glass sheets so that they can be used as an optical filter. This optical filter has improved stiffness and mechanical strength, and is also beneficial in terms of, for example, scratch resistance by virtue of the hard principal surfaces thereof. A large benefit is obtained from this perspective particularly when a relatively flexible curable resin is used as the binder or the matrix.

TABLE 1

| | Benzyl-phosphonic acid | 4-Chlorobenzyl-phosphonic acid | Phenyl-phosphonic acid | n-Butyl-phosphonic acid | Phosphoric acid ester compound | Copper acetate monohydrate |
|---|---|---|---|---|---|---|
| | Materials used and amount thereof [g] | | | | | |
| Example 1 | 3.144 | — | — | — | 4.333 | 4.500 |
| Example 2 | — | 3.774 | — | — | 4.333 | 4.500 |
| Example 3 | — | 3.774 | — | 0.577 | 4.847 | 5.400 |
| Comparative Example 1 | — | — | 2.508 | — | 7.172 | 4.500 |
| Comparative Example 2 | — | — | — | 2.523 | 4.333 | 4.500 |

| | Mass ratio of content of phosphonic acid to content of phosphoric acid ester compound | | Molar ratio of content of phosphonic acid to content of copper ion | |
|---|---|---|---|---|
| | Aralkyl-phosphonic acid | Alkyl-phosphonic acid | Aralkyl-phosphonic acid | Alkyl-phosphonic acid |
| Example 1 | 0.726 | 0 | 0.810 | 0 |
| Example 2 | 0.871 | 0 | 0.811 | 0 |
| Example 3 | 0.871 | 1.123 | 0.811 | 0.927 |
| Comparative Example 1 | 0.350 | 0 | 0.704 | 0 |
| Comparative Example 2 | 0 | 0.582 | 0 | 0.811 |

TABLE 2

| | Optical properties | | | | | |
|---|---|---|---|---|---|---|
| | (I) | | | (III) | | |
| | Maximum transmittance between 300 to 350 nm [%] | Maximum transmittance between 300 to 360 nm [%] | (II) UV cut-off wavelength [nm] | Average transmittance between 450 to 600 nm [%] | (IV) IR cut-off wavelength [nm] | Maximum transmittance between 800 to 1000 nm [%] |
| Ex. 1 | 0.03 | 0.47 | 405 | 80.53 | 681 | 0.87 |
| Ex. 2 | 0.24 | 0.36 | 422 | 80.44 | 690 | 2.31 |
| Ex. 3 | 0.02 | 0.23 | 412 | 84.60 | 680 | 0.81 |
| Comp. Ex. 1 | 0.00 | 0.24 | 386 | 86.28 | 637 | 0.85 |
| Comp. Ex. 2 | 30.77 | 48.54 | 361 | 85.52 | 706 | 1.42 |

| | Optical properties | | | | | |
|---|---|---|---|---|---|---|
| | — | (V) | (VI) | — | | |
| | Maximum transmittance between 800 to 1050 nm [%] | Maximum transmittance between 800 to 1100 nm [%] | Maximum transmittance between 800 to 1150 nm [%] | Maximum transmittance between 800 to 1200 nm [%] | (VII) $\Delta T_{50\%}$ [nm] | Thickness of light-absorbing film [µm] |
| Ex. 1 | 0.87 | 1.01 | 2.07 | 5.06 | 276 | 104 |
| Ex. 2 | 2.31 | 2.67 | 4.55 | 9.16 | 268 | 122 |
| Ex. 3 | 0.81 | 0.81 | 1.54 | 3.97 | 268 | 121 |
| Comp. Ex. 1 | 1.97 | 5.14 | 12.17 | 23.75 | 251 | 285 |
| Comp. Ex. 2 | 1.42 | 1.42 | 1.42 | 1.50 | 345 | 101 |

The invention claimed is:

1. A light-absorbing composition comprising:
a light absorber including a phosphonic acid represented by the following formula (A) and copper ion; and
a curable resin, where $R_1$ to $R_5$ are each independently a hydrogen atom, a halogen atom, a hydroxy group, or a nitro group, and n represents an integer of 1 to 3, wherein
the light-absorbing composition is capable of being cured to form a light-absorbing film,
the light-absorbing film has a first transmittance spectrum for a transmitted light with respect to an incident light with a wavelength range of 300 nm to 1200 nm at an incident angle of 0°, and
the first transmittance spectrum satisfies the following requirements (i), (ii) and (iii):
(i) a UV cut-off wavelength which lies in the wavelength range of 350 nm to 450 nm and at which a spectral transmittance is 50% is in the wavelength range of 400 nm to 450 nm;
(ii) an IR cut-off wavelength which lies in the wavelength range of 600 nm to 750 nm and at which a spectral transmittance is 50% is in the wavelength range of 700 nm or less; and
(iii) a difference determined by subtracting the UV cut-off wavelength from the IR cut-off wavelength is 240 nm or more.

2. The light-absorbing composition according to claim 1, wherein the first transmittance spectrum further satisfies the following requirements (iv), (v), (vi), and (vii):
(iv) a spectral transmittance is 1% or less in the wavelength range of 300 nm to 350 nm;
(v) an average transmittance in the wavelength range of 450 nm to 600 nm is 75% or more;
(vi) a spectral transmittance is 10% or less in the wavelength range of 800 nm to 1100 nm; and
(vii) a spectral transmittance is 15% or less in the wavelength range of 800 nm to 1150 nm.

3. The light-absorbing composition according to claim 1, wherein a molar ratio of a content of the phosphonic acid to a content of the copper ion is 0.7 to 0.9.

4. The light-absorbing composition according to claim 1, wherein the IR cut-off wavelength is in the wavelength range of 680 nm to 700 nm.

5. A light-absorbing film comprising:
a light absorber including a phosphonic acid represented by the following formula (A) and copper ion; and
a cured product of a curable resin, where $R_1$ to $R_5$ are each independently a hydrogen atom, a halogen atom, a hydroxy group, or a nitro group, and n represents an integer of 1 to 3, wherein
the light-absorbing film has a first transmittance spectrum for a transmitted light with respect to an incident light with a wavelength range of 300 nm to 1200 nm at an incident angle of 0°, and
the first transmittance spectrum satisfies the following requirements (i), (ii), and (iii):
(i) a UV cut-off wavelength which lies in the wavelength range of 350 nm to 450 nm and at which a spectral transmittance is 50% is in the wavelength range of 400 nm to 450 nm;
(ii) an IR cut-off wavelength which lies in the wavelength range of 600 nm to 750 nm and at which a spectral transmittance is 50% is in the wavelength range of 700 nm or less; and
(iii) a difference determined by subtracting the UV cut-off wavelength from the IR cut-off wavelength is 240 nm or more.

6. The light-absorbing film according to claim 5, wherein the first transmittance spectrum further satisfies the following requirements (iv), (v), (vi), and (vii):
(iv) a spectral transmittance is 1% or less in the wavelength range of 300 nm to 350 nm;
(v) an average transmittance in the wavelength range of 450 nm to 600 nm is 75% or more;
(vi) a spectral transmittance is 10% or less in the wavelength range of 800 nm to 1100 nm; and
(vii) a spectral transmittance is 15% or less in the wavelength range of 800 nm to 1150 nm.

7. The light-absorbing film according to claim 5, wherein a molar ratio of a content of the phosphonic acid to a content of the copper ion is 0.7 to 0.9.

8. An optical filter comprising the light-absorbing film according to claim 5.

9. The optical filter according to claim 8, wherein
the optical filter has a second transmittance spectrum for a transmitted light with respect to an incident light with a wavelength of 300 nm to 1200 nm at an incident angle of 0°, and
the second transmittance spectrum satisfies the following requirements (I), (II), and (III):
(I) a UV cut-off wavelength which lies in the wavelength range of 350 nm to 450 nm and at which a spectral transmittance is 50% is in the wavelength range of 400 nm to 450 nm;
(II) an IR cut-off wavelength which lies in the wavelength range of 600 nm to 750 nm and at which a spectral transmittance is 50% is in the wavelength range of 700 nm or less; and (III) a difference determined by subtracting the UV cut-off wavelength from the IR cut-off wavelength is 240 nm or more.

10. The optical filter according to claim 9, wherein the second transmittance spectrum further satisfies the following requirements (IV), (V), (VI), and (VII):
   (IV) a spectral transmittance is 1% or less in the wavelength range of 300 nm to 350 nm;
   (V) an average transmittance in the wavelength range of 450 nm to 600 nm is 75% or more;
   (VI) a spectral transmittance is 10% or less in the wavelength range of 800 nm to 1100 nm; and
   (VII) a spectral transmittance is 15% or less in the wavelength range of 800 nm to 1150 nm.

11. The light-absorbing film according to claim 5, wherein the IR cut-off wavelength is in the wavelength range of 680 nm to 700 nm.

* * * * *